United States Patent
Windisch et al.

(10) Patent No.: US 6,284,697 B1
(45) Date of Patent: *Sep. 4, 2001

(54) COMPOUNDS OF THE RARE EARTHS AND THEIR USE AS POLYMERIZATION CATALYSTS FOR UNSATURATED COMPOUNDS

(75) Inventors: Heike Windisch, Bergisch Gladbach; Gerd Sylvester, Leverkusen; Rudolf Taube, Freising; Steffen Maiwald, Merseburg, all of (DE)

(73) Assignee: Bayer AG, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,722

(22) Filed: May 7, 1998

(30) Foreign Application Priority Data

May 14, 1997 (DE) ................................ 197 20 171

(51) Int. Cl.[7] ........................................ B01J 31/00
(52) U.S. Cl. ................ 502/102; 502/152; 502/154; 502/153; 502/155; 502/156; 526/164
(58) Field of Search ................... 502/102, 152, 502/154, 155, 156, 153; 526/164

(56) References Cited

U.S. PATENT DOCUMENTS 5,296,433 * 3/1994 Siedle et al. .................. 502/117
5,908,904 * 6/1999 Sylvester et al. .............. 526/153
5,958,820 * 9/1999 Taube et al. ................... 502/102
5,959,047 * 9/1999 Nickias et al. ................. 526/127

FOREIGN PATENT DOCUMENTS

| 43 34 045 | 4/1995 | (DE) . |
| 0 011 184 | 10/1979 | (EP) . |
| 0 727 447 | 2/1996 | (EP) . |
| WO 96 31544 | 10/1996 | (WO) . |
| WO 96/31543 | 10/1996 | (WO) . |
| WO 96/31544 | 10/1996 | (WO) . |

OTHER PUBLICATIONS

Taube et al., WO/9631544, English Translation, Oct. 10, 1996.*
"Complex Catalysis", Taube et al., Journal of Organometallic Chemistry, 1992, pp. 431–442.
Macromol. Symp. 89, 393–409, (1995) The Catalysis of the Stereospecific Butadiene . . . Comparison, Rudolf Taube et al.

* cited by examiner

Primary Examiner—Cynthia H. Kelly
Assistant Examiner—Dawn Garrett
(74) Attorney, Agent, or Firm—Connolly Bove Lodge & Hutz LLP

(57) ABSTRACT

The present invention relates to a new catalyst based on allyl complexes of the rare earths, of general formula $$[(C_3R^1_5)_rM^1(X)_{2-r}(D)_n]^+[M^2(X)_p(C_6H_{5-q}R^2_q)_{4-p}]^- \quad (I),$$

to the preparation of this new catalyst, and to its use for the polymerization of unsaturated compounds, particularly of conjugated dienes, in solution and in the gas phase.

4 Claims, No Drawings

COMPOUNDS OF THE RARE EARTHS AND THEIR USE AS POLYMERIZATION CATALYSTS FOR UNSATURATED COMPOUNDS

This invention relates to a catalyst, to the preparation thereof, and to the use thereof for the polymerisation of unsaturated compounds, particularly of conjugated dienes, in solution and in the gas phase.

Polybutadiene which comprises a high proportion of cis-1,4-units has long been produced on an industrial scale and is used for the production of automobile tires and other rubber products. It is polymerised in the liquid phase, using very different catalyst systems. One particularly advantageous catalyst system for the production of polybutadiene comprising a high proportion of cis-1,4-units is described in EP 11184. The catalyst system which is described therein and which is used for the polymerisation of butadiene in solution consists of a rare earth carboxylate, an aluminum alkyl and a halogen-containing Lewis acid. On the other hand, the Ziegler-Natta system based on inorganic salts of the rare earths which is known in the art contains, in addition to halogen-free organoaluminium compounds, partially- and/or perfluorinated organoboron Lewis acids for the production of 1,4-polydiolefines in solution. It is also known that allyl complexes of the rare earths, in combination with co-catalysts, preferably in combination with alumoxanes in this respect, and in non-polar solvents such as toluene and n-heptane, are suitable catalysts for the polymerisation of butadiene to give a high content of 1,4-cis double bonds [R. Tauhe, H. Windisch, S. Maiwald, *Makromol. Symp.* 89 (1995) 393–409].

The polymerisation of conjugated dienes in solution has the disadvantage that during the separation of unreacted monomers and of the solvent from the polymer which is formed, low molecular weight compounds can enter the environment via the drawn-off air and via the waste water and therefore have to be disposed of. In addition, large amounts of solvents have to be used, and have to be separated at a high energy cost. The solvents are generally combustible and readily flammable, and therefore constitute a potential hazard.

In recent years, the gas phase process has been proved to be particularly advantageous, especially for the production of polyethylene and polypropylene, and has become widespread industrially. The advantages of the gas phase process are due in particular to the fact that no solvents are used, and emissions and waste water contamination can be reduced.

Compared with the multiplicity of Ziegler-Natta systems which are based on titanium, cobalt, nickel or neodymium and which are suitable for solution polymerisation, only a few catalyst systems have hitherto been known for the polymerisation of conjugated dienes, particularly to form polybutadiene, from the gas phase. In DE 4334045, EP 727447 and WO 96/31543, catalyst systems were described for the first time which made it possible to polymerise conjugated dienes, particularly butadiene, in the gas phase. The catalysts described there consist of Ziegler-Natta catalysts based on compounds of the rare earths, organoaluminium Lewis aids, and an inorganic support. Another catalyst of system, which is described in WO 96/31544, consists of allyl compounds of the rare earths in combination with aluminum-containing organometallic Lewis acids on inert inorganic support materials. In particular, polymers with a high content of 1,4-cis double bonds are obtained from the gas phase by using these catalysts. However, very large amounts of organoaluminium compounds are necessary as co-catalysts in all these catalyst systems in order to produce catalysts which have a sufficiently high activity.

For the allyl complexes of the rare earths, particularly the tris(allyl) complexes of neodymium and lanthanum, it is known that these complexes catalyse the polymerisation of butadiene, as definite catalysts without the addition of co-catalysts in aromatic solvents, with the formation of polymers comprising what are mainly 1,4-trans double bonds, wherein the activities of these catalysts are low. With these complexes, polymerisation to form 1,4-cis-butadiene only occurs in the presence of co-catalysts, preferably methylalumoxane [R Taube, H. Windisch, S. Maiwald, H. Hemling, H. Schumann; *J. Organomet. Chem.*, 513 (1996) 49–61]. As is generally known alumoxanes are dynamic mixtures of different compounds which are structurally undefined, and which only have a limited shelf life in their commercially available form as solutions in hydrocarbons ["Alumoxanes", *Macromolecular Symposia* 97(1995)].

The object of the present invention was therefore to provide catalysts for the polymerisation of unsaturated compounds, particularly of conjugated dienes such as butadiene, which are suitable, as defined compounds without co-catalysts, for polymerisation in solution and in the gas phase.

Surprisingly, it has now been found that structurally defined allyl complexes of the rare earths, comprising a structurally defined cation based on the rare earths and a corresponding anion, are suitable, without the addition of co-catalysts, for the polymerisation of unsaturated compounds, particularly conjugated dienes such as butadiene, wherein, at a constant level of 1,4-cis selectivity, higher catalytic activities are achieved compared with previously known catalysts.

The present invention therefore relates to a catalyst based on allyl complexes of the rare earths, of formula (I)

$$[(C_3R^1{}_5)_rM^1(X)_{2-r}(D)_n]^+[M^2(X)_p(C_6H_{5-q}R^2{}_q)_{4-p}]^- \qquad (I),$$

wherein

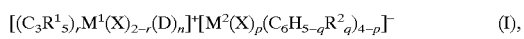

$M^1$ denotes a trivalent element of the rare earths of atomic numbers 21, 39, 57 to 71, X is the same or different and denotes an anion, D is the same or different and denotes a neutral donor ligand, $M^2$ represents an element of group IIIb of the periodic table of the elements (PTE) [F.A. Cotton, G. Wilkinson, Anorganische Chemie, 4th Edition, VCH Verlagsgesellchaft mbH, Weinheim, 1985], $R^1$ is the same or different and represents hydrogen, a linear or branched, saturated or singly- or multiply-unsaturated $C_1$-$C_{30}$ alkyl radical or $C_5$-$C_{30}$ cycloakyl radical which may optionally contain one or more hetero atoms such as N, P, O or S, a $C_6C_{30}$ aryl radical which may optionally contain one or more hetero atoms, which is optionally singly- or multiply-substituted by alkyl, alkynyl or alkenyl radicals comprising 1 to 30 C. atoms or by phenyl groups comprising 6 to 30 carbon atoms and which can be condensed with other aromatic compounds containing 6 to 30 carbon atoms, or represents a silyl group which is substituted by alkyl, alkenyl or alkynyl groups comprising 1 to 30 C. atoms or by phenyl groups comprising 6 to 30 C. atoms, $R^2$ is the same or different and represents a fluorine atom or a fluoroalkyl group comprising 1 to 10 carbon atoms, n represents an arbitrary number from 0 to 10, preferably 0 to 5, -continued

| | |
|---|---|
| p | represents an arbitrary number from 0 to 3, preferably 0 to 2, |
| q | represents an arbitrary number from 1 to 5, preferably 2 to 5, and |
| r | represents an arbitrary number from 1 to 2. |

Compounds of formula (I) are preferably used in which

| | |
|---|---|
| $M^1$ | denotes lanthanum, cerium, praseodymium and neodymium or a mixture of elements of the rare earths, which contains at least 10, preferably 30% by weight, of at least one of the elements lanthanum, cerium, praseodymium or neodymium, most preferably lanthanum, praseodyniium or neodymium, |
| X | denotes an allyl group of formula $C_3R^1{}_5$, e.g. $C_3H_5$, $C_3H_4$(1-Me), $C_3H_4$(2-Me), $C_3H_3$(1,3-Me)$_2$ or $C_3H(1, 1^1,3, 3^1$-Me)$_4$, a halide such as F, Cl, Br or I, a sulphonate of formula $O_3SR^1$ or $O_3SR^2$, e.g. $O_3SCF_3$, an amide of formula $NR^1{}_2$, e.g. $NPh_2$, $N(C_2H_4NMe_2)_2$, $N(C_2H_4OMe)_2$, $N(SiMe_3)_2$ or $N(SiHMe_2)_2$, a pyridyl of formula $NC_5R^1{}_5$, e.g. $NC_5H_4(2-C_2H_5NMe_2)$, a dipyridyl of formula $N_2C_{10}R^1{}_8$, e.g. $(2,2'-NC_5H_4)_2$, a pyrazolate of formula $N_2C_3R^1{}_3$, e.g. $N_2C_3H(3,5-Ph)_2$, $N_2C_3H(3-Me)(5-Ph)$, $N_2C_3H(3,5-tert.-Bu)_2$, a pyrazolyl borate of formula $R^1B(N_2C_3R^1{}_3)_3$, e.g. $HB(N_2C_3H_3)_3$ or $HB(N_2C_3H(3,5-Me)_2)_3$, a benzamidinate of formula $(R^1N)_2CR^1$, e.g. $(Me_3 SiN)_2CPh$, $(Me_3SiN)_2CC_6H_4$-(4-Me) or $(Me_3SiN)_2CC_6H_4$(4-OMe), an alcoholate or phenolate of formula $OR^1$, e.g. $OC(tert.-Bu)_3$, $OC(tert.-Bu)_2Ph$ or $OC_6H_2(2,6-tert.-Bu)_2$(4-Me), a siloxane of formula $OSiR^1{}_3$, e.g. $OSi(tert.-Bu)_3$ or $OSi(Ph)_3$, a thiolate of formula $SR^1$, e.g. $SC_6H_3(2,6-tert.-Bu)_2$, a cyclhopentadienyl of formula $C_5H_rR^1{}_{5-r}$ where r equals 0 to 5, e.g. $C_5H_5$, $C_5Me_5$, $C_5Ph_4H$, $C_5Bz_5$, $C_5H_4$-tert. -Bu, $C_5H_4Me$ or $C_5H_3(SiMe_3)_2$, an indenyl of formula $C_9H_{7-s}R^1{}_s$ where s equals 0 to 7, e.g. $C_9H_7$ or $C_9H_4Me_3$, a fluorenyl of formula $C_{13}H_{9-t}R^1{}_t$ where t equals 0 to 9, a phenyl of formula $C_6H_rR^1{}_{5-r}$, branched or unbranched primary, secondary or tertiary alkyl, alkenyl or alkynyl radicals comprising 1 to 20 carbon atoms, e.g. $CH_3$, $CMe_3$, $CH_2Ph$, $CH_2(C_6H_4$(4-Me)), $CH(SiMe_3)_2$, $CH_2(SiMe_3)$, $CCSiMe_3$ or $CCPh$, wherein $R^1$ and $R^2$ have the meanings described above, |
| D | denotes a neutral donor ligand comprising one, two or three identical or different donor atoms of groups Vb or VIb of the periodic table of the elements, such as N, P,O or S, and comprising unbranched, branched or cyclic, aliphatic or olefinic, primary, secondary or tertiary alkyl radicals containing 1 to 20 carbon atoms, or unsubstituted or substituted aromatic radicals containing 6 to 20 carbon atoms, e.g. those of formulae $R^1O((CR^1{}_2)_qO)_nR^1$, such as $CH_3OCH_3$, $C_2H_5OC_2H_5$, $(i-C_3H_7)O(i-C_3H_7)$, $CH_3O(i-C_3H_7)$, $(n-C_4H_9)O(n-C_4H_9)$, $CH_3O(C_2H_4)OCH_3$ or $CH_3O(C_2H_4)O(C_2H_4)OCH_3$, those of formula $O(CR^1{}_2)_n$, e.g. $OC_4H_8$ Or $OC_4H_7Me$, those of formula $R^1{}_2N((CR^1{}_2)_qNR^1)_nNR^1{}_2$, such as $N(CH_3)_3$, $N(C_2H_5)_3$, $N(i-C_3H_7)_3$, $NPh(CH_3)_2$, $NPh_2(CH_3)$, $(CH_3)_2N(C_2H_4)N(CH_3)_2$ or $(C_5H_{10})N(C_2H_4)N(C_5H_{10})$, those of formula $S(CR^1{}_2)_n$, such as $SC_4H_8$, $SC_4H_7Me$, or a neutral hydrocarbon comprising olefinic or aromatic groups containing 2 to 40 C atoms, such as 1,3-butadiene, isoprene, 2,4-hexadiene, 1,5-dimethylhexa-2,4-diene, $C_6H_6$, $C_6H_5Me$, $C_6H_3Me_3$ or $C_6Me_6$, wherein $R^1$, q and n have the meanings described above, and |
| $M^2$ | is boron or aluminium. |

The following are cited as preferred examples of $R^1$ and $R^2$ radicals of formula (I):
H, $CH_3$, $C_2H_5$, n-$C_3H_7$, i-$C_3H_7$, n-$C_4H_9$, i-$C_4H_9$, C(tert.-Bu)$_3$, CH(tert.-Bu)$_2$Ph, $CH_2$Ph, $C_6H_5$, $C_6H_4$(4-Me), $C_6H_4$(4-OMe), $C_6H_2(2,2'$-tert.-Bu)$_2$(4-Me), $C_2H_4$OMe, $C_2H_4NMe_2$, $SiMe_3$, $SiHMe_2$, F, $CF_3$, $C_2F_5$ and $C_4F_9$.

Catalysts of the following structural formulae are particularly preferred:
[La(C$_3$H$_5$)$_2$(THF)$_4$][B(C$_6$F$_5$)$_4$]
[La(C$_3$H$_5$)$_2$(THF)$_4$][B(C$_6$H$_3$(2,6-CF$_3$)$_2$)$_4$]
[La(C$_3$H$_5$)$_2$(TMED)$_2$][B(C$_6$F$_5$)$_4$]
[La(C$_3$H$_5$)$_2$(TMED)$_2$][B(C$_6$H$_3$(2,6-CF$_3$)$_2$)$_4$]
[La(C$_3$H$_5$)$_2$][B(C$_6$F$_5$)$_4$]
[La(C$_3$H$_5$)$_2$][B(C$_6$H$_3$(2,6-CF$_3$)$_2$)$_4$]
[La(C$_3$H$_5$)$_2$][B(C$_3$H$_5$)(C$_6$F$_5$)$_3$]
[(C$_5$Me$_5$)La(C$_3$H$_5$)][B(C$_6$F$_5$)$_4$]
[(C$_5$Me$_5$)La(C$_3$H$_5$)][B(C$_6$H$_3$(2,6-CF$_3$)$_2$)$_4$]
[(C$_5$Me$_5$)La(C$_3$H$_5$)][B(C$_3$H$_5$)(C$_6$F$_5$)$_3$]
[(C$_5$H$_5$)La(C$_3$H$_5$)][B(C$_6$F$_5$)$_4$]
[(C$_5$H$_5$)La(C$_3$H$_5$)][B(C$_6$H$_3$(2,6-CF$_3$)$_2$)$_4$]
[(C$_5$H$_5$)La(C$_3$H$_5$)][B(C$_3$H$_5$)(C$_6$F$_5$)$_3$]
[(C$_5$Me$_4$H)La(C$_3$H$_5$)][B(C$_6$F$_5$)$_4$]
[(C$_5$Me$_4$H)La(C$_3$H$_5$)][B(C$_6$H$_3$(2,6-CF$_3$)$_2$)$_4$]
[(C$_5$Me$_4$H)La(C$_3$H$_5$)][B(C$_3$H$_5$)(C$_6$F$_5$)$_3$]
[(C$_9$H$_7$)La(C$_3$H$_5$)][B(C$_6$F$_5$)$_4$]
[(C$_9$H$_7$)La(C$_3$H$_5$)][B(C$_6$H$_3$(2,6-CF$_3$)$_2$)$_4$]
[(C$_9$H$_7$)La(C$_3$H$_5$)][B(C$_3$H$_5$)(C$_6$F$_5$)$_3$]
[(C$_9$H$_5$Me$_2$)La(C$_3$H$_5$)][B(C$_6$F$_5$)$_4$]
[(C$_9$H$_5$Me$_2$)La(C$_3$H$_5$)][B(C$_6$H$_3$(2,6-CF$_3$)$_2$)$_4$]
[(C$_9$H$_5$Me$_2$)La(C$_3$H$_5$)][B(C$_3$H$_5$)(C$_6$F$_5$)$_3$]
[(C$_9$H$_4$Me$_3$)La(C$_3$H$_5$)][B(C$_6$F$_5$)$_4$]
[(C$_9$H$_3$Me$_3$)La(C$_3$H$_5$)][B(C$_6$H$_3$(2,6-CF$_3$)$_2$)$_4$]
[(C$_9$H$_4$Me$_3$)La(C$_3$H$_5$)][B(C$_3$H$_5$)(C$_6$F$_5$)$_3$]
[(N(SiMe$_3$)$_2$)La(C$_3$H$_5$)][B(C$_6$F$_5$)$_4$]
[(N(SiMe$_3$)$_2$)La(C$_3$H$_5$)][B(C$_6$H$_3$(2,6-CF$_3$)$_2$)$_4$]
[(N(SiMe$_3$)$_2$)La(C$_3$H$_5$)][B(C$_3$H$_5$)(C$_6$F$_5$)$_3$]
[La(C$_3$H$_5$)Cl][B(C$_6$F$_5$)$_4$]
[La(C$_3$H$_5$)Cl][B(C$_6$H$_3$(2,6-CF$_3$)$_2$)$_4$]
[La(C$_3$H$_5$)Cl][B(C$_3$H$_5$)(C$_6$F$_5$)$_3$]
[La(C$_3$H$_5$)Br][B(C$_6$F$_5$)$_4$]
[La(C$_3$H$_5$)Br][B(C$_6$H$_3$(2,6-CF$_3$)$_2$)$_4$]
[La(C$_3$H$_5$)Br][B(C$_3$H$_5$)(C$_6$F$_5$)$_3$]
[La(C$_3$H$_5$)I][B(C$_6$F$_5$)$_4$]
[La(C$_3$H$_5$)I][B(C$_6$H$_3$(2,6-CF$_3$)$_2$)$_4$]
[La(C$_3$H$_5$)I][B(C$_3$H$_5$)(C$_6$F$_5$)$_3$]
[La(C$_3$H$_5$)$_2$][Al(C$_6$F$_5$)$_4$]
[La(C$_3$H$_5$)$_2$][Al(C$_3$H$_5$)(C$_6$F$_5$)$_3$]
[La(C$_3$H$_5$)$_2$][Al(C$_6$F$_5$)$_3$Cl]
[Nd(C$_3$H$_5$)$_2$(THF)$_4$][B(C$_6$F$_5$)$_4$]
[Nd(C$_3$H$_5$)$_2$(THF)$_4$][B(C$_6$H$_3$(2,6-CF$_3$)$_2$)$_4$]

[Nd(C₃H₅)₂][B(C₆F₅)₄]
[Nd(C₃H₅)₂][B(C₆H₃(2,6-CF₃)₂)₄]
[Nd(C₃H₅)₂][B(C₃H₅)(C₆F₅)₃]
[(C₅Me₅)Nd(C₃H₅)][B(C₆F₅)₄]
[(C₅Me₅)Nd(C₃H₅)][B(C₆H₃(2,6-CF₃)]
[(C₅H₅)Nd(C₃H₅)][B(C₆H₃(2,6-CF₃)₂)₄]
[(C₅H₅)Nd(C₃H₅)][B(C₃H₅)(C₆F₅)₃]
[Nd(C₃H₅)Cl][B(C₆F₅)₄]
[Nd(C₃H₅)Cl][B(C₆H₃(2,6-CF₃)₂)₄]
[Nd(C₃H₅)Cl][B(C₃H₅)(C₆F₅)₃]
[Nd(C₃H₅)₂][Al(C₆F₅)₄]
[Nd(C₃H₅)₂][Al(C₃H₅)(C₆F₅)₃]
[Nd(C₃H₅)₂][Al(C₆F₅)₃Cl]

The catalysts of formula (I) can be used in the polymerisation in isolated form, or can be used in dissolved form, directly after their production and without prior isolation.

The preparation of catalysts (I) can be effected as follows, for example:

Neutral π-allyl complexes of a trivalent rare earth element, of formula (II)

$$(C_3R^1_5)_sM^1(X)_{3-s}(D)_n \quad (II),$$

where $R^1$, $M^1$, X, D and n have the above meanings, and where s represents an arbitrary number from 1 to 3, are reacted, in a suitable inert solvent, such as halogenated hydrocarbons e.g. methylene chloride and/or chlorobenzene, ethers e.g. tetrahydrofuran, diethyl ether, dimethoxyethane and/or dioxane, thioethers e.g. tetrahydrothiophen, tertiary amines e.g. triethylamine, as well as aliphatic, cycloaliphatic and/or aromatic solvents, e.g. n-pentane, n-hexane, n-heptane, cyclohexane, benzene and/or toluene, at temperatures between the melting- and boiling-point of the solvent, preferably at −80 to 140° C., most preferably at −40 to 80° C., with a Lewis acid of formula (III)

$$M^2(X)_m(C_6H_{5-q}R^2_q)_{3-m} \quad (III),$$

where $M^2$, $R^2$, p and q have the above meanings and m denotes an arbitrary number from 0 to 2, or with a Brönsted acid of formula (IV)

$$[(D)_nH]^+[M^2(X)_p(C_6H_{5-q}R^2_q)_{4-p}]^- \quad (IV),$$

where $M^2$, $R^2$, p and q have the above meanings and m denotes an arbitrary number from 0 to 2, in a molar ratio of reactants (II): (III) or (II): (IV) of 1:0.1 to 100, preferably 1:0.2 to 10, and most preferably 1:0.5 to 2.

The example represented by reaction equation (1) can be used to illustrate the general reaction of (II) with (III):

$$Nd(C_3H_5)_3+B(C_6F_5)_3 \rightarrow [Nd(C_3H_5)_2][B(C_3H_5)(C_6F_5)_3] \quad (1).$$

The example represented by reaction equation (2) can be used to illustrate the general reaction of (II) with (IV):

$$Nd(C_3H_5)_3+[N(CH_3)_3H][B(C_6F_5)_4] \rightarrow [Nd(C_3H_5)_2$$
$$[B(C_3H_5)(C_6F_5)_3]+C_3H_6+N(CH_3)_3 \quad (2).$$

Depending on the reaction conditions and on the solvent used, the complexes of formula (I) which are obtained can be isolated as addition compounds, e.g. with ethers or amines which are bonded to the allyl complex of the rare earth element. Examples of suitable ethers or amines include: diethyl ether, tetrahydrofuran, dimethoxyethane, dioxane, trimethylamine, triethylamine or tetramethylethylenediamne.

Examples of compounds of formula (II) include neutral π-allyl complexes of a trivalent rare earth element, such as the allyl compounds which have already been described in WO 96/31544 for example. It is also possible to use addition compounds of these allyl complexes with other compounds, e.g. ethers, amines and/or alkali metal or alkaline earth metal compounds, such as $LiR^1$, $NaR^1$, $KR^1$ and $MgR^1_2$, where $R^1$ is as described above.

The following compounds of formula (II) are particularly suitable:
Nd(C₃H₅)₃(O₂C₄H₈)
La(C₃H₅)₃(O₂C₄H₈)₁.₅
La(C₃H₅)₃(MeOC₂H₄OMe)
La(C₃H₅)₃(Me₂NC₂H₄NMe₂)
Nd(C₃H₅)₃
La(C₃H₅)₃
Cp*La(C₃H₅)₂
CpLa(C₃H₅)₂
Cp*Nd(C₃H₅)₂
CpNd(C₃H₅)₂
La(C₃H₅)₂Cl(THF)₂
Nd(C₃H₅)₂Cl(THIF)₂
La(C₃H₅)₂Cl(THF)₃
La(C₃H₅)₂Br(THF)₂
La(C₃H₅)₂I(THF)₂
(N(SiMe₃)₂)La(C₃H₅)₂(THF)₂
(N(SiMe₃)₂)₂La(C₃H₅)(THF)
[Li(C₄H₈O₂)₁.₅][La(C₃H₅)₄]
[Li(C₄H₈O₂)₂][Cp*La(C₃H₅)₃]
[Li(DME)₃][Cp*Nd(C₃H₅)₃]
[Li(C₄H₈O₂)₂][CpLa(C₃H₅)₃]
[Li(C₄H₈O₂)₂][CpNd(C₃H₅)₃]
[Li(C₄H₈O₂)₂][Ind La(C₃H₅)₃]
[Li(C₄H₈O₂)₂][Flu La(C₃H₅)₃]
[K(THF)₂][La(C₃H₅)₄],
wherein
Cp*=C₅Me₅
Cp=C₅H₅
Ind=C₇H₅, and
Flu=C₉H₇.

In the case of addition compounds with alkali or alkaline earth organometallic compounds, the elimination of two anions which are complexed with the rare earth element is necessary for the formation of the complex of formula (I). Reactants (II): (III) or (II): (IV) are then reacted in a molar ratio of 1:1.1 to 100, preferably 1:1.2 to 10, most preferably 1:1.5 to 3.

Compounds which are preferably used as Lewis acids of formula (III) are compounds of trivalent elements of IIIb, such as boron and aluminium, to which at least one phenyl group which is substituted with fluorine atoms or fluoroalkyl groups is bonded. Lewis acids comprising two or three of the fluorine-substituted phenyl groups described above are particularly preferred. Examples of suitable Lewis acids of formula (III) include: B(C₆F₅)₃, B(CH₃)(C₆F₅)₂, B(C₂H₅)(C₆F₅)₂, B(C₆H₄F₂)₃, B(C₆H₃F₃)₃, B[C₆H₃(CF₃)₂]₃, B[C₆H₂(CF₃)₃]₃, B(C₂H₅)₂[C₆H₃(F₃)], Al(C₆F₅)₃, Al(CH₃)(C₆F₅)₂, Al(C₂H₅)(C₆F₅)₂, Al[C₆H₃(CF₃)₂] and Al[C₆H₂(CF₃)₃]₃.

Compounds which are preferably used as Brönsted acids of formula (IV) are compounds of trivalent elements of IIIb, such as boron and aluminium, to which at least one phenyl group which is substituted with fluorine atoms or CF₃ groups is bonded. Brönsted acids comprising two or three of the fluorine-substituted phenyl groups described above are particularly preferred. Examples of suitable Lewis acids of formula (IV) include:

| | |
|---|---|
| $[N(CH_3)_3H][B(C_6F_5)_4]$, | $[N(C_2H_5)_3H][B(C_6F_5)_4]$, $[N(C_3H_7)_3H][B(C_6F_5)_4]$, |
| $[N(CH_3)_2(C_2H_5)H][B(C_6F_5)_4]$, | $[\{C_6H_5N(CH_3)_2\}H][B(C_6F_5)_4]$, |
| $[N(CH_3)_3H][B\{C_6H_3(CF_3)_3\}4]$, | $[\{C_6H_5N(CH_3)_2\}H][B(C_6H_3(CF_3)_2\}_4]$, |
| $[N(CH_3)_3H][B\{C_6H_2(CF_3)_3\}_4]$, | $[\{C_6H_5N(CH_3)_2\}H][B(C_6H_2(CF_3)_3\}_4]$, |
| $[N(CH_3)_3H][B(CH_3)(C_6F_5)_3]$, | $[\{C_6H_5N(CH_3)_2\}H][B(CH_3)(C_6F_5)_3]$, |
| $[N(CH_3)_3H][B(C_2H_5)(C_6F_5)_3]$, | $[\{C_6H_5N(CH_3)_2\}H][B(C_2H_5)(C_6F_5)_3]$, |
| $[N(CH_3)_3H][B(C_6H_4F_2)_4]$, | $[\{C_6H_5N(CH_3)_2\}H][B(C_6H_4F_2)_4]$; |
| $[N(CH_3)_3H][B(C_6H_3F_3)_4]$, | $[\{C_6H_5N(CH_3)_2\}H][B(C_6H_3F_3)_4]$; |
| $[N(CH_3)_3H][Al(C_6F_5)_4]$, | $[\{C_6H_5N(CH_3)_2\}H][Al(C_6F_5)_4]$, |
| $[N(CH_3)_3H][Al\{(C_6H_3(CF_3)_2\}_4]$, | $[\{C_6H_5N(CH_3)_2\}H][Al\{C_6H_3(CF_3)_2\}_4]$; |
| $[N(CH_3)_3H][Al(CH_3)(C_6F_5)_3]$, | $[\{C_6H_5N(CH_3)_2\}H][Al(CH_3)(C_6F_5)_3]$, |
| $[N(CH_3)_3H][Al(C_2H_5)(C_6F_5)_3]$, | $[\{C_6H_5N(CH_3)_2\}H][Al(C_2H_5)(C_6F_5)_3]$, |
| $[N(CH_3)_3H][Al\{C_6H_2(CF_3)_3\}_4]$, | $[\{C_6H_5N(CH_3)_2\}H][Al\{C_6H_2(CF_3)_3\}_4]$. |

The present invention also relates to the use of the catalysts of formula (I) according to the invention for the polymerisation of unsaturated compounds in solution and in the gas phase.

Due to the high sensitivity of allyl complexes of the rare earths to traces of oxygen and moisture, any polymerisation using these catalysts is subject to special requirements, i.e. polymerisation installations which employ high vacuum technology, and specially purified solvents, monomers and inert gases. However, polymerisation can also be conducted in apparatuses such as those which are customarily used for polymerisation with Ziegler-Natta catalysts, and can be carried out with the use of conventionally purified solvents, monomers and inert gases if appropriate amounts of a scavenger are added. The use of a scavenger has no effect on the formation and structure of the actual catalyst of formula (I).

Substances which can be used as scavengers include organometallic compounds which have a sufficiently high reactivity towards the impurities which have an adverse effect on catalysis, such as traces of oxygen and moisture for example, and which are also chemically inert towards the catalyst, i.e. which do not transfer carbanions to the allyl cation of catalyst compound (I) and which thus do not result in the formation of neutral allyl complexes of the trivalent rare earth element, and which are not themselves active as regards the polymerisation in the sense of the invention of the monomers used.

Alkyl, hydride or mixed alkyl/hydride derivatives of metals of groups IIa and IIIb of the PTE are preferably used as scavengers, such as those of formula:

$$M^3R^3_z \qquad (V),$$

wherein $M^3$ is a metal of groups IIa or IIIb of the periodic table of the elements,
$R^3$ is a linear or branched alkyl radical comprising 1 to 20 carbon atoms or a $C_5$—$C_6$ cycloalkyl radical or an aromatic radical comprising 6 to 20 carbon atoms, or a hydrogen atom, and
z is a number from 2 to 3 which depends on the valency of the metal, wherein if z is equal to 3 only one of the three $R^3$ radicals may be a hydrogen atom.

Examples of suitable compounds of formula (V) include: dibutylmagnesium, butylethyimagnesium, trimethylaluminium, triethylaluminium, tri-n-propylaluminium, triiso-propylaluminium, tri-n-butylaluminium, tri-iso-butylaluminium, tripentyl-aluminium, trihexylaluminium, tricyclohexylaluminium, trioctylaluminium, diethylaluminium hydride, di-n-butylaluminium hydride and di-iso-butyl aluminium hydride.

It is also possible to add a conjugated diene to the catalyst comprising catalyst compound (I) or to the catalyst comprising compound (I) and a scavenger, wherein this diene can be the same diene which is subsequently to be polymerised using the catalyst. Butadiene and isoprene are preferably used.

The ratio in which catalyst compound (I) is used with a scavenger and/or diene can be varied within wide limits. The molar ratio of catalyst compound (I) to scavenger is 1:0 to 1:1000, preferably 1:0.5 to 1:100, most preferably 1:1 to 1:20. The molar ratio of catalyst compound (I) to diene is 1:0 to 1:10,000, preferably 1:0 to 1:100, most preferably 1:0 to 1:10.

The catalyst described above can be produced by various methods, e.g. by the following methods:

A solution and/or suspension of the catalyst is prepared by dissolving or suspending catalyst (I), which is produced separately, in an inert solvent and/or diluent. It is also possible to produce catalyst (I), without an additional isolation stage and in a suitable solvent and/or diluent, from compounds of formula (II) and compounds of formula (III) and/or (IV), wherein at least one of the compounds used must be dissolved in the solvent used. Moreover, a diene may be present in all the production variants described. The sequence of addition of the inert solvents and/or diluents and of catalyst (I) or of the individual compounds for the in situ production of catalyst (I), as well as the optional addition of the scavenger and/or of the diene, can be arbitrarily varied.

Halogenated hydrocarbons such as methylene chloride and chlorobenzene, as well as aliphatic, cycloaliphatic and/or aromatic solvents such as pentane, hexane, heptane, cyclohexane, benzene and/or toluene, can be used, separately or in admixture, as inert solvents and/or diluents.

In order advantageously to use the catalyst which is suitable for solution polymerisation for gas phase polymerisation also, it is recommended that the catalyst is produced in heterogeneous form, i.e. is deposited on an inert support material.

Particulate inorganic solids, and also particulate polymeric organic solids, which have a specific surface greater than 10, preferably of 10 to 1000 $m^2/g$ (BET), and a pore volume of 0.3 to 15, preferably of 0.5 to 12 ml/g, are used as the support material, which behaves in an inert manner during the polymerisation reaction.

The (BET) specific surface is determined in the usual manner [see, for example, S. Brunauer, P. H. Emmet and Teller, *J. Amer. Chem. Soc.* 60 (2) (1938) 309], and the pore volume is determined by the centrifuging method [M. McDaniel, *J. Colloid Interface Sci.* 78 (1980) 31].

Substances which are particularly suitable as inorganic solids include silica gels, clays, aluminosilicates, french chalk, zeolites, carbon black, graphite, activated carbon, inorganic oxides, such as silica, alumina, magnesia and titania for example, as well as silicon carbide, preferably silica gels, zeolites and carbon black, most preferably silica gel. Organic support materials are also suitable, such as polyethylene, polypropylene, polystyrene or polybutadiene for example.

Said inorganic solids which comply with the aforementioned specification and which are therefore suitable for use, are described in more detail, for example, in *Ullmanns Enzyklopädie der technischen Chemie*, Volume 21, page 439 et seq. (Silica gels), Volume 23, page 311 et seq. (Clays), Volume 14, page 633 et seq. (Carbon blacks), Volume 24, page 575 et seq. and Volume 17, page 9 et seq. (Zeolites).

The inorganic and organic polymeric solids may be used separately or in admixture with each other. 0.01 g to 10 g of catalyst compound (I), preferably 0.5 to 5 g of catalyst compound (I), are used per 100 g of support material.

The preparation of a catalyst fixed to a support depends on the support material used, wherein the reactivity of the support material towards catalyst compound (I) or towards the individual compounds of formulae (II), (III) and/or (IV) is decisive for the production of catalyst compound (I) and the scavenger.

If the support material is chemically inert towards the other compounds, i.e. if no reaction of the support material takes place with the other compounds which are used, the sequence of addition of the inert solvents and/or diluents, of catalyst compound (I) or of the individual compounds for the production of catalyst compound (I), and optionally that of the scavenger and diene also, can be arbitrarily varied.

For example, the support material can be slurried in the inert solvent and/or diluent, the scavenger can subsequently be added thereto, and finally catalyst compound (I) can be added, or compounds (II), (III) and/or (IV) can be added for the production of catalyst compound (I). It is also possible to prepare a solution of catalyst compound (I) or a solution of catalyst compound (I) with the scavenger and/or the diene, by the method just described, and to add this solution to the support material, which is either slurried in an inert solvent and/or diluent or is present in the dry state.

If the support material is not inert to the other compounds, as is known, for example, for support materials with surface OH groups in relation to organometallic compounds, the activity of the catalyst obtained depends on the sequence of addition of the individual compounds.

In this situation, for example, the support material can be slurried in the inert solvent and/or diluent, followed first of all by the addition of the scavenger and, after a desired time of reaction, by the addition of catalyst compound (I) or of the individual compounds for producing catalyst compound (I) and optionally of the diene also. The addition of catalyst compound (I) or of the individual compounds for producing catalyst compound (I) and optionally of the diene can then be effected in an arbitrary sequence.

The solvents used may be the same or different for all compounds, or may be used in admixture. After the desired time, the solvent and/or diluent used is separated by distillation, optionally under vacuum, whereupon the supported catalyst is obtained as a free-flowing solid.

The amount of inert solvent and/or diluent which is used can be varied within wide limits. For economic reasons, this amount will be kept as small as possible. The minimum amount depends on the amount and on the solubility of the individual compounds and on the pore volume of the support material. An amount of 10 to 2000 parts of solvent and/or diluent per 100 parts of support material is preferably used.

The preparation of the catalyst can be effected over a wide temperature range. In general, the temperature is between the melting- and boiling point of the inert diluent and/or solvent. Temperatures of −20 to 80° C. are usually employed.

The catalyst according to the invention is suitable for the polymerisation of unsaturated compounds, particularly for the polymerisation of conjugated dienes, preferably 1,3-butadiene, isoprene, pentadiene and/or dimethylbutadiene.

Polymerisation is effected by bringing the conjugated diene into contact with the catalyst described above. For solution polymerisation, the monomers are dissolved in a solvent and/or diluent. For gas phase polymerisation, other gases, which are employed either for dilution, for the dissipation of heat or for controlling the molecular weight, can be mixed with the monomer which is present in gaseous form.

Polymerisation can be effected at pressures from 1 mbar to 50 bar, preferably at 1 to 20 bar. In general, polymerisation is conducted at temperatures from −20 to 250° C., preferably at 0 to 200° C., most preferably at 20 to 160° C.

In one commonly used embodiment, the polymerisation of 1,3-butadiene in solution, for example, is conducted as follows:

Catalyst compound (I), optionally with or without a scavenger and optionally with a diene, is added, either separately or as a catalyst mixture, in a solvent and/or diluent which is produced as described above, to a mixture of solvent and butadiene with a solvent : butadiene ratio of 100:5 to 40% by weight, preferably 100:8 to 30% by weight, wherein the solvents used may be the same or different. Polymerisation commences after an initiation phase of 0.5 to 30 minutes, depending on the solvent and on the polymerisation conditions, and can be identified by the evolution of heat and by an increase in the viscosity of the solution. The polymerisation is conducted with or without external temperature control. After the desired conversion has been reached, the catalyst is deactivated, by adding, for example, small amounts of water, carboxylic acids and/or alcohols.

Customary stabilisers, such as sterically hindered phenols or aromatic amines for example, are added in the usual amounts to the polymer solutions before work-up. Isolation of the polymers is effected by concentrating the polymer solution by evaporation, by precipitation with a non-solvent, such as methanol, ethanol or acetone for example, or by steam distillation of the solvent. Drying is effected by customary methods, e.g. in a drying oven, a vacuum drying oven or a screw feed drier.

Depending on the solvent used, the polymers produced according to the invention have a different content of 1,4-cis double bonds, which is 94–99% corresponding to polymerisation conditions in methylene chloride and is 78–79% in toluene, for example. The presence of the scavenger has no direct influence on the formation of the catalyst, but results in stabilisation of the catalytically active complex, particularly in polymerisation solutions with a low catalyst concentration of catalyst compound (I), which is very sensitive to impurities, and thus results in an increase in activity to more than 8000 kg polymer per mole of catalyst compound (I).

In one commonly used form, the gas phase polymerisation of 1,3-butadiene, for example, can be conducted in any apparatus which is suitable for gas phase polymerisation. Thus a stirred reactor, a rotary reactor or a fluidised bed reactor, or a combination of these types of reactor, can be used. It is possible to add inert powder media, such as silica gel or carbon black, during gas phase polymerisation, but this has not been found to be necessary for the gas phase polymerisation which is described according to the invention, since the commencement of agglutination of the rubber particles formed at low butadiene pressure could be obviated by a slight pressure increase which was caused by the addition of monomer and/or by increasing the temperature, and the free-flowing nature of the product was thus retained.

For gas phase polymerisation, the catalyst according to the invention is introduced into an apparatus which is suitable for keeping the pulverulent catalyst in motion. This can be effected by stirring, by rotation or by a gas stream for example. The inert gas, e.g. argon, which is first present in the gas space, is then replaced by the gaseous monomer. Polymerisation sets in immediately and the temperature rises. The monomer is fed to the reactor, optionally diluted with an inert gas, at a rate such that the desired reaction temperature is not exceeded. The reaction temperature can be adjusted in the usual manner by heating or cooling. Polymerisation is terminated by stopping the feed of monomer. The polymer can be further processed in the known manner, by deactivating the catalyst and treating the polymer with known anti-ageing media, for example.

The following examples serve to elucidate the invention which is described here.

EXAMPLES

The solvents used for examples 1 to 9 were boiled for several hours in an argon atmosphere over the corresponding purifying materials (THF (tetrahydrofuran) was treated with sodium/benzophenone, TBF-$d_8$ and $C_6D_6$ with sodium-potassium alloy, $CH_2Cl_2$ with $CaH_2$ and molecular sieve 4A), and were distilled off under argon immediately before use. The toluene solvent which was used for examples 10 to 26 was distilled azeotropically under nitrogen and was then passed through an $Al_2O_3$ column; the methylene chloride was boiled over $CaH_2$ for several hours under argon, distilled off and stored under inert gas. The syntheses and polymerisations were conducted under argon using the standard Schlenk technique [S. Herzog, .J. Dehnert, Z. Chem. 4 (1964) 1]. Solution polymerisation was conducted under argon in 0.5 l bottles which were closed by a septum. Determination of the microstructure of the polybutadiene was effected by means of IR spectroscopy.

Example 1
Preparation of $[Nd(\pi-C_3H_5)_2(THF)_4][B\{C_6H_3(2,6-CF_3)_2\}_4]$ To prepare this catalyst complex, an amount of 1.23 g $[NMe_3H][B(C_6F_5)_4]$, which dissolved in the reaction mixture within 30 minutes, was added to a solution of 0.59 g $Nd(\pi-C_3H_5)_3(O_2C_4H_8)$ in 5 ml tetrahydrofuran at 20° C. in a Schlenk vessel under argon. The slightly turbid solution was purified by filtration and was then evaporated to dryness under vacuum at 20° C. 1.75 g of a green, finely crystalline solid of composition $[Nd(\pi-C_3H_5)_2(THF)_4][B(C_6F_5)_4]$ were obtained in a yield of 89%. A catalyst stock solution was prepared by dissolving 1.75 g of the $[Nd(\pi-C_3H_5)_2(THF)_4]$ $[B(C_6F_5)_4]$ complex described above in 5 ml $CH_2Cl_2$ at 20° C., and was used for the polymerisation described below.

Solution polymerisation in toluene 0.7 ml of a 2 molar solution of $Al(i-C_4H_9)_3$ (=TIBA) in toluene was added as a scavenger to a solution of 17.3 g 1,3-butadiene in 150 ml toluene in a 250 ml Schlenk vessel under argon at 20° C. 0.5 ml of the catalyst stock solution described above was then added (i.e. 146 $\mu$moles $[Nd(C_3H_5)_2(THF)_4][B(C_6F_5)_4]$). Polymerisation was conducted at 20° C. and was terminated after 60 minutes by the addition of 10 ml methanol with 0.3 g BKF. The polymer was precipitated in methanol and was dried for 24 hours at 60° C. in a vacuum drying oven. 10.2 g polybutadiene was obtained (i.e. 59% conversion at a conversion efficiency of 70 kg (BR)/moles (Nd)/hour), and had a content of 57% 1,4-cis-, 41% 1,4-trans- and 2% 1,2-units.

Solution polymerisation in $CH_2Cl_2$ 0.35 ml of a 2 molar solution of TIBA in toluene was added as a scavenger to a solution of 11.6 g 1,3-butadiene in 75 ml toluene in a 250 ml Schlenk vessel under argon at 5° C. 0.25 ml of the catalyst stock solution described above was then added (i.e. 73 $\mu$moles $[Nd(C_3H_5)_2(THF)_4][B(C_6F_5)_4]$). A considerable rise in temperature, which was associated with an increase in the viscosity of the solution, was ascertained even 20 seconds after the addition of the catalyst. The polymerisation was terminated after 1 minute by the addition of 10 ml methanol with 0.3 g BKF. The polymer was precipitated in methanol and was dried for 24 hours at 60° C. in a vacuum drying oven. 10.9 g polybutadiene was obtained (i.e. 94% conversion at a conversion efficiency of 8900 kg (BR)/moles (Nd)/hour), and had a content of 88% 1,4-cis-, 10% 1,4-trans- and 2% 1,2-units.

Examples 2 to 14

Characterisation of the reaction of formation of catalyst (I) by NMR spectroscopy In accordance with the data in Table 1, the neutral allyl complexes of rare earths of formula (II) were reacted at 25° C., in the given quantitative ratio and in the respective solvent, with compounds of formula (III) or (IV), and the reaction solutions were characterised by NMR spectroscopy. Complete reaction with the formation of allyl complex (I) was ascertained in all the tests.

TABLE 1

$^{11}$B and $^{29}$Al NMR spectroscopic shifts of borate and aluminate during the reaction of formation of allyl complex (I) at 25° C. with equimolar ratios of compounds (II):(III) of 1:1 and 1:2

| No. | Compound (II) | Compound (III) | Solvent | $^{11}$B in ppm | $^{29}$Al in ppm |
|---|---|---|---|---|---|
| 2 | La($\pi$-$C_3H_5$)$_3$(dioxane)$_{1.5}$ | B($C_6F_5$)$_3$ | THF-$d_8$ | −13.4 | |
| 3 | La($\pi$-$C_3H_5$)$_3$(HMPT)$_2$ | B($C_6F_5$)$_3$ | $C_6D_6$ | −13.7/−14.6 | |
| 4 | [Li(dioxane)$_{1.5}$][La($\pi$-$C_3H_5$)$_4$] | 2 B($C_6F_5$)$_3$ | THF-$d_8$ | −13.4 | |
| 5 | La($\pi$-$C_3H_5$)$_2$Cl(THF)$_2$ | B($C_6F_5$)$_3$ | THF-$d_8$ | −13.4 | |
| 6 | La($\pi$-$C_3H_5$)$_2$Cl(THF)$_2$ | B($C_6F_5$)$_3$ | $CH_2Cl_2$ | −14.0 | |
| 7 | La($\pi$-$C_3H_5$)$_2$Br(THF)$_2$ | B($C_6F_5$)$_3$ | THF-$d_8$ | −13.4 | |

TABLE 1-continued $^{11}$B and $^{29}$Al NMR spectroscopic shifts of borate and aluminate during the reaction of formation of allyl complex (I) at 25° C. with equimolar ratios of compounds (II):(III) of 1:1 and 1:2

| No. | Compound (II) | Compound (III) | Solvent | $^{11}$B in ppm | $^{29}$Al in ppm |
|---|---|---|---|---|---|
| 8 | La(π-C$_3$H$_5$)$_2$I(THF)$_2$ | B(C$_6$F$_5$)$_3$ | THF-d$_8$ | −13.4 | |
| 9 | Cp*La(π-C$_3$H$_5$)$_2$ | B(C$_6$F$_5$)$_3$ | THF-d$_8$ | −13.4 | |
| 10 | CpLa(π-C$_3$H$_5$)$_2$ | B(C$_6$F$_5$)$_3$ | THF-d$_8$ | −13.4 | |
| 11 | La(π-C$_3$H$_5$)$_2$N(SiMe$_3$)$_2$(THF) | B(C$_6$F$_5$)$_3$ | THF-d$_8$ | −13.4 | |
| 12 | La(π-C$_3$H$_5$)$_3$(dioxane)$_{1.5}$ | Al(C$_6$F$_5$)$_3$(OEt$_2$) | THF-d$_8$ | | 122.7 |
| 13 | [Li(dioxane)$_{1.5}$][La(π-C$_3$H$_5$)$_4$] | 2Al(C$_6$F$_5$)$_3$(OEt$_2$) | THF-d$_8$ | | 122.6 |
| 14 | | Al(C$_6$F$_5$)$_3$(OEt$_2$) | CH$_2$Cl$_2$ | | 130 |

In order to test the polymerisation activity of complexes (I) obtained, the NMR tube was shattered in a Schlenk vessel under argon, the solvent was removed by distillation under vacuum, and the catalyst obtained was treated with about 5 ml of a 2 molar solution of butadiene in toluene. In each case it was possible to detect polymerisation activity after a time of reaction of one hour, due to the increase in viscosity of the solution. The polymers obtained were not isolated.

Examples 15 to 18

Solution polymerisation with catalyst compound [Nd(C$_3$H$_5$)$_2$] [B(C$_3$H$_5$)(C$_6$F$_5$)$_3$] (in situ production from compounds (II) and (III) without a scavenger)

These tests were performed as solution polymerisations of 1,3-butadiene using catalysts which were produced in situ from Nd(C$_3$H$_5$)$_3$ as compound (II) and B(C$_6$F$_5$)$_3$ as compound (III), see Table 2. A defined amount of Nd(C$_3$H$_5$)$_3$ was melted under argon in a small glass tube, was placed in a polymerisation vessel with a solution consisting of a variable amount of a solvent, a variable amount of 1,3-butadiene, and one molar equivalent of B(C$_6$F$_5$)$_3$ with respect to compound (II), used as a 10% solution in toluene. The glass tube was shattered by shaking it. Polymerisation was conducted at 20° C. in a homogeneous solution, and was terminated by the addition of 10 ml methanol with 0.3 g BKF. The polymer was precipitated in methanol and was dried in a vacuum oven at 60° C.

Examples 19 to 25

Solution polymerisation with catalyst compounds [Nd(C$_3$H$_5$)$_2$][B(C$_3$H$_5$)(C$_6$F$_5$)$_3$] (19–24) and [Nd(C$_3$H$_5$)$_2$][B(C$_6$F$_5$)$_4$](25) (in situ production from compounds (II) and (III) or (IV) and a scavenger)

These tests were performed as solution polymerisations of 1,3-butadiene using catalysts consisting of Nd(C$_3$H$_5$)$_3$ as compound (II), B(C$_6$F$_5$)$_3$ as compound (III) or [C$_5$H$_5$NMe$_2$H][B(C$_6$F$_5$)$_4$] as compound (IV), and triisobutylaluminium (TIBA) as the scavenger; see Table 3. A defined amount of Nd(C$_3$H$_5$)$_3$ was melted under argon in a small glass tube, was placed in a polymerisation vessel with a solution consisting of a variable amount of a solvent, a variable amount of 1,3-butadiene, and a defined amount of TIBA and B(C$_6$F$_5$)$_3$ or [C$_5$H$_5$NMe$_2$H][B(C$_6$F$_5$)$_4$] with respect to the neodymium compound. The glass tube was shattered by shaking it. In examples 19–21 the temperature suddenly increased from 20 to about 55° C. after about 3 minutes. Examples 22–25 were carried out with external cooling at 20° C. in a homogeneous solution. The polymerisation was terminated by the addition of 10 ml methanol with 0.3 g BKF. The polymer was precipitated in methanol and dried at 60° in a vacuum oven.

TABLE 2

| No. | Nd(C$_5$H$_3$)$_3$ | B(C$_6$F$_5$)$_3$* | Solvent | Butadiene | t | BR | CE** | cis | trans | 1,2 |
|---|---|---|---|---|---|---|---|---|---|---|
| 15 | 29.8 mg | 0.59 ml | 10 ml CH$_2$Cl$_2$ | 3.0 g | 20 min | 1.3 g | 35 | 96.8% | 1.2% | 2.0% |
| 16 | 16.3 mg | 0.32 ml | 150 ml CH$_2$Cl$_2$ | 12.1 g | 2.5 h | 2.3 g | 17 | 96.2% | 1.5% | 2.4% |
| 17 | 18.4 mg | 0.37 ml | 150 ml toluene | 14.8 g | 16 h | 5.1 g | 5 | 78.6% | 18.9% | 2.6% |
| 18 | 20.7 mg | 0.41 ml | 150 ml toluene | 7.1 g | 1.8 h | 5.3 g | 38 | 79.4% | 18.1% | 2.5% |

B(C$_6$F$_5$)$_3$*: 10% solution in toluene; CE** in kg(BR)/moles (Nd)/hour

TABLE 3

| No. | Nd(C$_3$H$_3$)$_3$ | Co-catalyst | | TIBA$^b$ | Solvent | C$_4$H$_6$ | t |
|---|---|---|---|---|---|---|---|
| 19 | 19.7 mg | 0.78 ml (2) | B(C$_6$F$_3$)$_3$$^a$ | 0.92 ml (5) | 150 ml CH$_2$Cl$_2$ | 31.2 g | 5 min |
| 20 | 18.2 mg | 0.36 ml (1) | B(C$_6$F$_2$)$_3$$^a$ | 0.85 ml (5) | 150 ml CH$_2$Cl$_2$ | 33.6 g | 5 min |
| 21 | 7.7 mg | 0.15 ml (1) | B(C$_6$F$_3$)$_3$$^a$ | 0.36 ml (5) | 150 ml CH$_2$Cl$_2$ | 26.3 g | 5 min |
| 22 | 19.9 mg | 0.79 ml (2) | B(C$_6$F$_3$)$_3$$^a$ | 0.93 ml (5) | 150 ml CH$_2$Cl$_2$ | 19.6 g | 25 min |
| 23 | 11.1 mg | 0.22 ml (1) | B(C$_6$F$_3$)$_3$$^a$ | 1.0 ml (10) | 150 ml CH$_2$Cl$_2$ | 49.8 g | 20 min |

TABLE 3-continued

| 24 | 16.9 mg | 0.34 ml (1) B(C$_6$F$_3$)$_3$[a] | | 0.85 ml (5) | 150 ml toluene | 19.5 g | 95 min |
|---|---|---|---|---|---|---|---|
| 25 | 7.6 mg | 1.00 ml (1) [C$_6$H$_5$NMe$_2$H][B(C$_6$F$_5$)$_4$][c] | | 1.42 ml (20) | 150 ml CH$_2$Cl$_2$ | 16.8 g | 2 min |

| | BR | CE* | 1,4-cis | 1,4-trans | 1,2 | Mn[d] | Mw[e] | Mw/Mn | [η] |
|---|---|---|---|---|---|---|---|---|---|
| 19 | 22.0 g | 3584 | 92.7% | 6.3% | 1.0% | 158,000 | 756,000 | 4.8 | 3.20 |
| 20 | 22.5 g | 3888 | 93.6% | 5.5% | 0.9% | 133,000 | 608,800 | 4.6 | 2.98 |
| 21 | 10.2 g | 4251 | 98.1% | 0.8% | 1.1% | 170,000 | 495,000 | 2.9 | 3.42 |
| 22 | 12.6 g | 406 | 97.2% | 1.8% | 1.0% | nd. | n.d. | n.d. | n.d. |
| 23 | 9.1 g | 658 | 98.9% | 0.6% | 0.5% | n.d. | n.d. | n.d. | n.d. |
| 24 | 9.4 g | 94 | 77.9% | 19.4% | 2.7% | n.d. | n.d. | n.d. | n.d. |
| 25 | 8.2 g | 857 | 91.2% | 7.4% | 1.4% | n.d. | n.d. | n.d. | n.d. |

[a]10% solution of B(C$_6$F$_5$)$_3$ in toluene; moles (B)/moles (Nd) in brackets
[b]0.4 moles/l solution of TIBA in toluene; moles (Al)/moles (Nd) in brackets
[c]0.0266 moles/l solution of [PhNMe$_2$H][B(C$_6$F$_5$)$_4$] in CH$_2$Cl$_2$; moles (Al)/moles (Nd) in brackets
[d]Mn in g/mole; determined via viscosity determination
[e]Mw in g/mole; determined via light scattering
CE*: in kg(BR)/moles(Nd)/h

Example 26

Catalyst consisting of a support material with scavenger, treated with a solution of catalyst compound [Nd(C$_3$H$_5$)$_2$][B(C$_3$H$_5$)(C$_6$F$_5$)$_3$] and a scavenger a) Pretreatment of the support:

A silica gel supplied by Grace Davison with a BET specific surface of 300 m$^2$/g was used as the support. The average particle size was 50 μm. The silica gel was dried for 24 hours at 250° C. 17.9 ml TIBA were added drop-wise, with stirring, to a suspension of 28.6 g of the dried silica gel in 200 ml n-hexane. After stirring for one hour at 25° C. in the reaction solution, the treated silica gel was filtered off, washed with n-hexane and dried under vacuum.

b) Preparation of the catalyst:

1.1 ml of a 0.03 molar solution of B(C$_6$F$_5$)$_3$ in toluene and 0.83 ml of a 0.4 molar solution of TIBA were added at 20° C., with stirring, to a solution of 8.8 mg Nd(C$_3$H$_5$)$_3$ in 5 ml methylene chloride. After ageing for 10 minutes, the catalyst solution obtained was added to 1.57 g of the support described in a), and the suspension was stirred for 10 minutes at 20° C. After distilling off the solvent at 20° C. under vacuum, a free-flowing powder was isolated.

c) Polymerisation:

The catalyst was introduced under argon into a polymerisation apparatus consisting of a flask fitted with a magnetic stirrer, a manometer and a gas attachment. The apparatus was evacuated and was subsequently filled with gaseous butadiene. The temperature of the batch was adjusted to 40° C. on a water bath. During polymerisation, the catalyst was continuously moved by means of the magnetic stirrer. The butadiene pressure in the polymerisation vessel was maintained between 1100 and 500 mbar by the successive addition of monomer. The polymerisation was followed by means of the pressure decrease in the polymerisation vessel. After 30 minutes, 2.6 g polybutadiene were obtained, containing 95.5% 1,4-cis, 4% 1,4-trans and 0.5% 1,2-units.

Example 27

Catalyst consisting of a support material with scavenger, treated with a solution of catalyst compound [Nd(C$_3$H$_5$)$_2$][B(C$_3$H$_5$)(C$_6$F$_5$)$_3$] and a scavenger a) Pretreatment of the support was effected analogously to example 26.

b) Preparation of the catalyst:

0.83 ml of a 0.4 molar solution of TIBA, 5 ml of a solution of 8.8 g tris(allyl)neodymium Nd(C$_3$H$_5$)$_3$ in methylene chloride, and 1.1 ml of a 0.03 molar solution of B(C$_6$F$_5$)$_3$ in toluene were added in succession at 20° C., with stirring and without prior ageing, to 2.4 g of the support described in a). The suspension was stirred for 10 minutes at 20° C. After distilling off the solvent at 20° C. under vacuum, a free-flowing powder was isolated.

c) Polymerisation:

Polymerisation was conducted as described in example 26c), at a temperature of 20° C. 1.2 g polybutadiene were obtained after 30 minutes, and 2.5 g polybutadiene were obtained after 120 minutes; the product contained 88.1% 1,4-cis, 9.3% 1,4-trans and 2.6% 1,2-units.

Example 28

Catalyst consisting of a support material with scavenger, treated with a solution of catalyst compound [Nd(C$_3$H$_5$)$_2$][B(C$_3$H$_5$)(C$_6$F$_5$)$_3$]

a) Pretreatment of the support was effected analogously to example 26.

b) Preparation of the catalyst:

1.8 ml of a 0.03 molar solution of B(C$_6$F$_5$)$_3$ in toluene were added at 20° C., with stirring, to a solution of 14.5 mg Nd(C$_3$H$_5$)$_3$ in 5 ml methylene chloride. After ageing for 10 minutes, the catalyst solution obtained was added to 1.95 g of the support described in a), and the suspension was stirred for 5 minutes at 20° C. After distilling off the solvent at 20° C. under vacuum, a free-flowing powder was isolated.

c) Polymerisation:

Polymerisation was conducted as described in example 26 c), for 11 minutes at 20° C. and then at 50° C. 1.8 g polybutadiene were obtained after 30 minutes, and 8.2 g polybutadiene were obtained after 3 hours; the product contained 96.6% 1,4-cis, 2.2% 1,4-trans and 1.2% 1,2-units.

Example 29

Comparative example using a catalyst consisting of a support material with scavenger, treated with a solution comprising a compound of formula (II) and a scavenger, without a compound of formulae (III) or (IV)

a) Pretreatment of the support was effected analogously to example 26.

b) Preparation of the catalyst:

0.6 ml of a 0.89 molar solution of TIBA in toluene were added at 20° C., with stirring, to a solution of 14.5 mg Nd($C_3H_5$)$_3$ in 5 ml methylene chloride. After ageing for 10 minutes, the catalyst solution obtained was added to 1.44 g of the support described in a), and the suspension was stirred for 5 minutes at 20° C. After distilling off the solvent at 20° C. under vacuum, a free-flowing powder was isolated.

c) Polymerisation:

Polymerisation was conducted as described in example 26 c), at 50° C. 0.3 g polybutadiene were obtained after 3 hours; its microstructure was not determined.

Example 30

Catalyst consisting of a support material with scavenger, treated with a solution of catalyst compound [Nd($C_3H_5$)$_2$][B($C_3H_5$)($C_6F_5$)$_3$] and a scavenger a) Microporous polypropene was used as the support; this was dried for 3 hours at 75 ° C. under vacuum before use.

b) Preparation of the catalyst:

1.85 ml of a 0.03 molar solution of B($C_6F_5$)$_3$ in toluene and 0.62 ml of a 0.89 molar solution of TIBA in toluene were added at 20° C., with stirring, to a solution of 14.9 mg Nd($C_3H_5$)$_3$ in 7 ml methylene chloride. After ageing for 15 minutes, the catalyst solution obtained was added to 2.22 g of the support described in a), and the suspension was stirred for 5 minutes at 20° C. After distilling off the solvent at 20° C. under vacuum, a free-flowing powder was isolated.

c) Polymerisation:

Polymerisation was conducted as described in example 26 c), for 11 minutes at 20° C. and then at 50° C. 5.0 g polybutadiene were obtained after 30 minutes, and 15.1 g polybutadiene were obtained after 3 hours; the product contained 93.0% 1,4-cis, 6.4% 1,4-trans and 0.6% 1,2-units.

What is claimed is:

1. A catalyst comprising allyl complexes of the rare earths of formula (I)

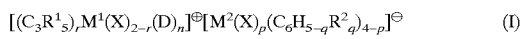  (I)

wherein:

- $M^1$ denotes a trivalent element of the rare earths of atomic numbers 21, 39, 57 to 71,
- X is the same or different and denotes an anion,
- D is the same or different and denotes a neutral donor ligand,
- $M^2$ represents an element of group IIIb of the periodic table of the elements,
- $R^1$ is the same or different and represents hydrogen, a linear or branched, saturated or singly- or multiply-unsaturated $C_1$-$C_{30}$ alkyl radical or $C_5$-$C_{30}$ cycloalkyl radical which may optionally contain one or more hetero atoms a $C_6$-$C_{30}$ aryl radical which may optionally contain one or more hetero atoms, which is optionally singly- or multiply-substituted by alkyl, alkynyl or alkenyl radicals comprising 1 to 30 carbon atoms or by phenyl groups comprising 6 to 30 carbon atoms and which can be condensed with other aromatic compounds containing 6 to 30 carbon atoms, or represents a silyl group which is substituted by alkyl, alkenyl or alkynyl groups comprising 1 to 30 carbon atoms or by phenyl groups comprising 6 to 30 carbon atoms,
- $R^2$ is the same or different and represents a fluorine atom or a fluoroalkyl group comprising 1 to 10 carbon atoms,
- n represents an arbitrary number from 0 to 10,
- p represents an arbitrary number from 0 to 3,
- q represents an arbitrary number from 1 to 5,
- r represents an arbitrary number from 1 to 2.

2. A catalyst according to claim 1, wherein a scavenger is added to catalyst (I), wherein said scavenger is an organometallic compound of formula:

$$M^3R^3_z,$$

wherein

- $M^3$ is a metal of groups IIa or IIIb of the periodic table of the elements,
- $R^3$ represents a linear or branched alkyl radical comprising 1 to 20 carbon atoms or a $C_5$—$C_{30}$ cycloalkyl radical or an aromatic radical comprising 6 to 20 carbon atoms, or a hydrogen atom, and
- z is a number from 2 to 3 which depends on the valency of the metal, wherein if z is equal to 3 only one of the three $R^3$ radicals may be a hydrogen atom, and wherein the molar ratio of catalyst (I) to scavenger is 1:0 to 1:1000.

3. A catalyst according to claim 1, characterized in that an inert, particulate inorganic solid, which has a specific surface area greater than 10 m²/g (BET), and a pore volume of 0.3 to 15 mL/g, is added to the catalyst in amounts of 0.1 g to 10 g of catalyst per 100 g of said inert, particulate inorganic solid.

4. A method of preparing a catalyst according to claim 1, characterized in that a compound of formula (II)

  (II)

wherein $R^1$, $M^1$, X, D and n have the meanings described in claim 1, and s is a number from 1 to 3, is reacted with a compound of formula (III)

  (III)

or with a compound of formula (IV)

  (IV)

wherein $M^2$, X, $R^2$, D, n, p, q and r have the same meanings specified in claim 1, and m is a number from 0 to 2, in an inert solvent, diluent or solvent/diluent mixture at temperatures from −80 to 140° C. in a molar ratio of compound (II):compound (III) or (IV) of 1:0.1 to 1:100.

* * * * *